United States Patent Office 3,847,946
Patented Nov. 12, 1974

3,847,946
HYDROGENATION
Marvin M. Johnson and Donald C. Tabler, Bartlesville, Okla., assignors to Phillips Petroleum Company
No Drawing. Original application Apr. 2, 1970, Ser. No. 25,239, now Patent No. 3,676,332. Divided and this application Mar. 9, 1972, Ser. No. 233,294
Int. Cl. C07d 63/02
U.S. Cl. 260—329.3                         13 Claims

ABSTRACT OF THE DISCLOSURE

A method and catalyst for reacting hydrogen with aromatic hydrocarbons, with sulfur-containing acyclic and heterocyclic compounds, and with nitrogen-containing acyclic and heterocyclic organic compounds, the catalyst being comprised essentially of supported molybdenum and arsenic in their reduced forms.

---

This application is a divisional application of copending Ser. No. 25,239, filed Apr. 2, 1970, now U.S. Pat. 3,676,332.

This invention relates to reacting hydrogen with organic compounds.

In one of its more specific aspects, this invention relates to reacting hydrogen with certain materials frequently found in hydrocarbon or petroleum fractions.

In petroleum processing, a wide variety of materials, differing appreciably as to origin, are found in a single petroleum stream. For example, as a result of various processing, certain petroleum streams have been found to contain sulfur-containing organic materials such as thiophenes and benzothiophenes, nitrogen-containing organic materials such as quinolines, and aromatics such as benzene. The elimination of such materials from such streams generally involves a plurality of steps, each affecting one or more of such materials in a manner simplifying their subsequent removal from the stock.

There has now been discovered a catalyst and a method by use of which the foregoing materials can be catalytically reacted with hydrogen, or hydrogenated, to effect their removal from the parent stream. The method and catalyst of the present invention provide for such hydrogenation.

According to the present invention, there is provided a method for hydrorefining petroleum streams which comprise contacting said stream with hydrogen and a supported catalyst comprised essentially of molybdenum and arsenic, said molybdenum and arsenic being in their reduced forms, to hydrogenate at least a portion of the hydrogenatable materials contained in said stream.

In one embodiment of this invention, when the stream contains organic sulfur-containing and/or nitrogen-containing compounds, the sulfur and/or nitrogen are converted to hydrogenated forms.

The hydrorefining can involve hydrogenation, hydrosulfurization and hydronitrogenation.

When the streams contain compounds such as unsaturated hydrocarbons, including olefins and aromatics, or unsaturated sulfur-containing and/or nitrogen-containing compounds, these compounds can be hydrogenated according to the process of this invention.

Examples of the unsaturated compounds which can be hydrogenated are hexene-1, octene-1, benzene, toluene, cyclohexene, diallyl sulfide, butenyl mercaptan, thiophene, dibenzothiophene, dihydrothiophene, dihexenyl amine, decenylamine, quinoline, pyridine, 2,4-dimethylpyridine, etc.

The sulfur-containing and nitrogen-containing compounds named above can also be reacted with hydrogen in the presence of the catalyst of this invention to convert their sulfur and/or nitrogen to hydrogen sulfide and ammonia. In addition, diethyl sulfide, dibutyl amine, tetrahydrothiophene, and pyridine and the like can be reacted with hydrogen to produce the corresponding saturated hydrocarbon residue after the removal of the sulfur and/or the nitrogen.

Accordingly, it is an object of this invention to provide a simplified process for hydrogenation.

It is another object of this invention to provide a simply prepared catalyst suitable for hydrogenation.

Hydrogenation of aromatic hydrocarbons, sulfur-containing acyclic and heterocyclic, and nitrogen-containing acyclic and heterocyclic compounds is a useful process as applied to various hydrocarbon streams containing these impurities encountered in the petroleum refining or petrochemical fields. This is particularly so when these materials are found in minor amounts in various feedstreams to processes in which their presence is deleterious as, for example, in contaminating catalysts, reducing yields, and the like. Accordingly, the method and catalyst of this invention find wide use in feed purification processes.

In general, the hydrorefining conditions of this invention involve a temperature of from about 250° F. to about 1000° F., pressures of from about 100 p.s.i.g. to about 3000 p.s.i.g., a feed rate of about 0.1 to about 10 LHSV and at an amount of hydrogen in the range of about 1 to about 50 moles per mole of compound to be reacted with the hydrogen.

The method of this invention employs a catalyst, comprised essentially of molybdenum and arsenic in their reduced forms. Preferably, the catalyst is supported. Alumina and activated alumina are most active, although other supports such as calcium aluminate, silica, titania, and magnesium oxide, can be used.

In general, the catalyst is prepared by impregnating the granular support with molybdenum and arsenic in the form of their water soluble compounds, the impregnation being done with each compound either separately or simultaneously. Thereafter, the impregnated support is dried in air at a temperature of about 850 to about 900° F. and reduced in a stream of hydrogen at a temperature of from about 800° F. to about 1000° F.

The amount of molybdenum and arsenic with which the support is impregnated will vary, depending upon the specific hydrogenation for which the catalyst is intended.

The finished catalyst will contain from about 2 to about 20 weight percent molybdenum and will have a molybdenum to arsenic weight ratio of about 1:1 to about 5:1. In its preferred composition, the catalyst will contain from about 5 to about 10 weight percent molybdenum and will have a molybdenum to arsenic weight ratio of from about 3:1 to about 4:1 for hydrogenation of aromatics and for hydrodesulfurization and hydrodenitrogenation. For hydrogenation of heterocyclic nitrogen-containing and/or heterocyclic sulfur-containing compounds, the weight ratio of molybdenum to arsenic is from about 1.5:1 to about 2.5:1.

The method and catalyst of this invention are particularly suitable for the hydrogenation of benzene when present in cyclohexane in an amount of from about 2 to about 50 weight percent. For such purposes, the hydrogenation is conducted at a temperature of from about 250 to about 550° F., at a pressure of from about 200 to about 1500 p.s.i.g., at a feed rate of from about 0.1 to about 10 liquid volumes per hour of feedstream per volume of catalyst (LHSV). Hydrogen is introduced into the reaction in an amount of from about 3 to about 15 moles per mole of benzene contained in the feedstream. Under such conditions, the benzene is hydrogenated to cyclohexane.

When employed for the hydrogenation of heterocyclic nitrogen- and/or sulfur-containing compounds, the method and catalyst are particularly suitable for the conversion of compounds such as thiophene to dihydrophiophene and/or tetrahydrothiophene, particularly when present in a hydrocarbon stream in an amount from about 2 to about 50 weight percent. For such purposes, the reaction is conducted at a temperature of from about 300° to 650° F., at a pressure of from about 500 to about 3000 p.s.i.g., at a feed rate of from about 0.1 to about 10 LHSV, with hydrogen being introduced into the reaction in an amount of about 1 mole per mole of thiophene when the conversion is to the dihydrothiophene and with hydrogen being introduced into the reaction in an amount of about 2 moles per mole of thiophene when the conversion is to the tetrahydrothiophene. The hydrogenated heterocyclic is generally removable from the feedstream by distillation.

When employed for hydrorefining of sulfur and/or nitrogen organic compounds, the method and catalyst of this invention generally produce gaseous sulfur-containing and nitrogen-containing compounds, such as hydrogen sulfide and ammonia, which are easily separated from the feedstream. In these hydrogenations, the reaction is generally conducted at temperature of from about 550 to about 1000° F., at a pressure of from about 100 to about 1500 p.s.i.g., at a feed rate of from about 0.1 to about 10 LHSV, with hydrogen being introduced into the reaction in an amount from about 0.5 to about 5 moles per mole of total feed.

In general, the aforementioned reactions can be conducted simultaneously when more than one of the hydrogenatable materials occurs in the same feedstream. However, the hydrogenation of aromatics is preferably conducted in the absence of sulfur compounds.

The method of this invention and procedures for preparing the catalysts are illustrated in the following examples.

EXAMPLE I

A catalyst comprised of 10 weight percent molybdenum and a mole ratio of molybdenum to arsenic of about 3 to 1 was prepared using 10–40 mesh particulate alumina as a support.

Five (5) grams of $H_3AsO_4$ were dissolved in 50 ml. water. Eighteen and five-tenths (18.5) grams of
$$(NH_4)_6Mo_7O_{24} \cdot 4H_2O$$
were added to the resulting solution. The white precipitate which formed on mixing was dissolved by adding 10 ml. of 28 percent ammonium hydroxide solution to the resulting solution to form a clear solution.

The total volume of the clear solution was slurried with 100 grams of dried alumina, the total volume of the clear solution being absorbed by the alumina. The alumina was then dried for 48 hours at room temperature and finally at 100° C. The dried alumina was heated in air at 960° F., for three hours to remove ammonia, after which the dried material was activated by heating in hydrogen at 800° F. for three hours. The finished catalyst contained 6.9 weight percent molybdenum and 1.9 weight percent arsenic.

EXAMPLE II

A second catalyst containing about 7.5 weight percent molybdenum and about 3.3 weight percent arsenic was prepared in the manner described in Example I, employing 8.7 grams of $H_3AsO_4$ in 30 ml. of water with 18.5 grams $(NH_4)_6Mo_7O_{24} \cdot 4H_2O$ and 40 ml. of 28 percent $NH_3$ solution. Ninety-four (94) grams of 10–40 mesh alumina were used.

These examples indicate methods of preparing catalysts of this invention.

EXAMPLE III

The catalyst of Example I was employed for the hydrogenation of benzene.

A feedstream comprised of n-pentane and 15 weight percent benzene was contacted with the catalyst and with hydrogen, the mole ratio of hydrogen to benzene being 8 to 1. The catalyst was maintained at 530° F. to 550° F. at a pressure of 800 p.s.i.g. The feedstream charge rate was 2 LHSV, being equivalent to a benzene LHSV of about 0.3. The run was conducted for a duration of seven hours. Initial conversion of the benzene to cyclohexane was 99.9 percent. Near the end of the seven-hour period, the temperature of the catalyst was increased to 620° F. with the result that the conversion of benzene to cyclohexane decreased to 76 percent.

The above example indicates the effectiveness of the catalyst and method of this invention in hydrogenating aromatics.

EXAMPLE IV

The above run was repeated with a catalyst prepared in Example II. Under the initial conditions of Example III, the initial conversion of benzene to cyclohexane was 95 percent, with conversion decreasing to 51 percent after six hours.

The above data serve to further illustrate the use of the method and catalyst of this invention in the hydrogenation of aromatics.

EXAMPLE V

A feedstream was prepared consisting of 2.92 weight percent thiophene in benzene. This stream was contacted with a catalyst prepared in Example II under the conditions indicated below with the results noted.

| Run No. | 1 | 2 | 3 | |
|---|---|---|---|---|
| Temperature, °F | 557 | 609 | 589 | 560 |
| Hydrogen rate, moles/mole thiophene | 30 | 30 | 30 | 30 |
| Pressure, p.s.i.g. | 1,000 | 1,000 | 1,300 | 1,300 |
| Feed rate, LHSV | 2 | 2 | 2 | 2 |
| Product analysis, wt. percent: | | | | |
| Thiophene | 1.55 | 0.630 | 0.939 | 1.46 |
| Tetrahydrothiophene | 0.76 | 0.70 | 1.07 | 0.845 |
| Conversion of thiophene, percent | 47.0 | 78.5 | 68.0 | 50.0 |

The above data indicate the operability of the method and catalyst of this invention in the hydrogenation of heterocyclic sulfur-containing compounds.

The foregoing data indicate that at temperatures below 650° F. and in a stoichiometric excess of hydrogen, the method and catalyst of this invention produce hydrogenation of the heterocyclic ring.

As mentioned, the method and catalyst of this invention are effective in effecting removal of sulfur and nitrogen from petroleum stocks, particularly aromatics, without hydrogenating the aromatic ring. This is indicated by the following.

EXAMPLE VI

To benzene was added 3.6 weight percent thiophene. This was the equivalent of a sulfur content of 1.37 weight percent. The resulting blend was then contacted with a catalyst containing 6.9 weight percent molybdenum and 1.9 weight percent arsenic supported on activated alumina which catalyst had been activated in hydrogen at 1000° F. Operating conditions and results were as follows:

Operating conditions:
  Temperature, °F. _____ 670–675
  Pressure, p.s.i.g. _____ 800
  Hydrogen, moles/mole thiophene _____ 23
  Feed rate, LHSV _____ 2
Thiophene content of product, wt. percent:
  After 1 hour operation _____ 0.082
  After 18 hours operation _____ 0.023

The effluent gas was passed through cadmium sulfate solution. Yellow cadmium sulfide formed showing that $H_2S$ was present in the effluent gas.

These data indicate the operation and continued effectiveness of the method and catalyst of this invention in hydrogenating sulfur compounds for the purpose of desulfurizing aromatic mixtures containing thiophene.

EXAMPLE VII

To benzene was added 1.7 weight percent dibenzothiophene. This was the equivalent of a sulfur content of 0.30 weight percent. The resulting blend was then contacted with a catalyst comprised essentially of 6.9 weight percent molybdenum and 1.9 weight percent arsenic supported on activated alumina which had been activated in hydrogen at 1000° F. Operating conditions and results were as follows:

Operating conditions:
  Temperature, °F. ------------------------ 657
  Pressure, p.s.i.g. ----------------------- 800
  Hydrogen, moles/mole dibenzothiophene ---- 120
  Feed rate, LHSV -------------------------- 2
Sulfur content of product, wt. percent: <0.03 (limit of detection).

The above data illustrate employment of the catalyst and method of this invention in sulfur removal from aromatics by hydrodesulfurization.

EXAMPLE VIII

To benzene were added both sulfur-containing and nitrogen-containing compounds, sulfur being added in the form of dibenzothiophene and nitrogen being added in the form of quinoline. Dibenzothiophene was added in an amount of 1.7 weight percent to provide a mixture having 0.30 weight percent sulfur and quinoline was added in an amount of 1.7 weight percent to provide a nitrogen content of 0.18 weight percent in the mixture. A portion of the resulting stream was contacted with that catalyst (I) employed in Example VII and a portion was contact with a catalyst (II) comprised essentially of about 7.5 weight percent molybdenum and about 3.3 weight percent arsenic on alumina, the catalyst having been activated with hydrogen at 800° F. Results were as follows:

| Catalyst | I | II |
|---|---|---|
| Temperature, °F | 662 | 711 |
| Pressure, p.s.i.g | 800 | 800 |
| Hydrogen, moles/mole S plus N compounds | 50 | 42 |
| Total feed rate, LHSV | 2 | 2 |
| Product analysis: | | |
| Sulfur, wt. percent | 0.110 | 0.22 |
| Nitrogen, wt. percent | 0.026 | 0.09 |

The above data indicate the operability of the catalyst and method of this invention over a wide range of conditions. The ability of the method and catalyst of this invention to hydrogenate such compounds as are concerned in the above examples, and particularly dibenzothiophene and quinoline, is of significance in that these materials are sometimes present in petroleum fractions and are difficult to remove.

It will be seen from the above that various modifications can be made to the method and catalyst of this invention. However, such are considered as being within the scope of the invention.

We claim:

1. A process for selectively hydrogenating the ring unsaturation of heterocyclic sulfur-containing compounds contained in a hydrocarbon feedstream which comprises contacting said feedstream with hydrogen and a molybdenum-arsenic catalyst consisting essentially of about 2 to 20 weight percent molybdenum and a molybdenum to arsenic weight ratio of about 1:1 to about 5:1 and an inorganic oxide support under hydrogenation conditions, said catalyst having been reduced with hydrogen prior to said contacting.

2. A process according to claim 1 wherein said support is selected from the group consisting of alumina, calcium aluminate, silica, titania, and magnesium oxide.

3. A process according to claim 2 wherein said hydrocarbon feedstream contains from about 2 to about 50 weight percent of said sulfur compound and said catalyst contains from about 5 to about 10 weight percent molybdenum, said molybdenum and said arsenic being present in a weight ratio of about 1.5:1 to about 2.5:1.

4. The method of claim 2 in which said hydrogenation is carried out at a temperature of from about 250° F. to about 1000° F., a pressure of from about 100 p.s.i.g. to about 3000 p.s.i.g., a feed rate of about 0.1 to about 10 LHSV, and employing at least a stoichiometric quantity of hydrogen.

5. The method of claim 2 in which said heterocyclic sulfur compounds in a hydrocarbon feedstock are selectively hydrogenated by contacting said feedstock and added hydrogen with said catalyst and a stoichiometric excess of hydrogen based upon heterocyclic compound in the feedstock at an elevated temperature of about 300° to about 650° F. sufficient to substantially hydrogenate said heterocyclic sulfur compounds, and separating hydrogenated heterocyclic compounds from the hydrogenated feedstock.

6. A process according to claim 5 wherein said feedstream comprises aromatic hydrocarbons containing thiophene or dibenzothiophene.

7. A process according to claim 5 wherein said feedstream comprises benzene containing thiophene or dibenzothiophene.

8. The method of calim 2 in which thiophene or dibenzothiophene in a diluent is contacted with a catalyst containing about 7.5 weight percent molybdenum and about 3.3 weight percent arsenic on alumina.

9. A process for hydrodesulfurizing heterocyclic sulfur-containing compounds contained in a hydrocarbon feedstream which comprises contacting said feedstream with hydrogen and a molybdenum-arsenic catalyst consisting essentially of about 2 to 20 weight percent molybdenum and a molybdenum to arsenic weight ratio of about 1:1 to about 5:1 and an inorganic oxide support under hydrodesulfurizing conditions, said catalyst having been reduced with hydrogen prior to said contacting.

10. A process according to claim 9 in which said hydrodesulfurization is carried out at a temperature from about 550 to about 1000° F., at a pressure of from about 100 to about 1500 p.s.i.g., at a feed rate of from about 0.1 to about 10 LHSV, with hydrogen being introduced into the reaction in an amount from about 0.5 to about 5 moles per mole of total feed.

11. A process according to claim 9 wherein said feedstream comprises aromatic hydrocarbons containing thiophene or dibenzothiophene.

12. A process according to claim 9 wherein said feedstream comprises benzene containing thiophene or dibenzothiophene.

13. A process according to claim 9 in which thiophene or dibenzothiophene in a diluent is contacted with a catalyst containing about 7.5 weight percent molybdenum and about 3.3 weight percent arsenic on alumina.

References Cited

UNITED STATES PATENTS 2,440,671   5/1948   Boyd --------------- 260—329

OTHER REFERENCES

Elderfield: Heterocyclic Compounds, vol. 4 (Wiley, New York, 1952), pp. 284–5.

Hartough et al.: Compounds with Condensed Thiophene Rings (Interscience, New York, 1954), pp. 232–3.

JOHN D. RANDOLPH, Primary Examiner

C. M. S. JAISLE, Assistant Examiner

U.S. Cl. X.R.

260—283 SY, 293.52, 329 R, 332.8, 583 R, 609 R, 667, 676 R, 683.9, 690